United States Patent
Ostrover

(10) Patent No.: US 10,264,218 B2
(45) Date of Patent: *Apr. 16, 2019

(54) METHOD, SYSTEM, AND APPARATUS FOR RECEIVING, PROCESSING AND RENDERING CONTENT RESPONSIVE TO USER AND DEVICE PARAMETERS

(75) Inventor: Lewis S. Ostrover, Los Angeles, CA (US)

(73) Assignee: Warner Bros. Home Entertainment Inc., Burbank, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/950,213

(22) Filed: Nov. 19, 2010

(65) Prior Publication Data

US 2011/0066706 A1    Mar. 17, 2011

Related U.S. Application Data

(63) Continuation of application No. 10/989,833, filed on Nov. 16, 2001, now abandoned, which is a continuation-in-part of application No. 10/977,634, filed on Oct. 29, 2004, now Pat. No. 7,805,453.

(51) Int. Cl.
| | |
|---|---|
| H04N 7/16 | (2011.01) |
| H04N 21/41 | (2011.01) |
| H04N 21/414 | (2011.01) |
| H04N 21/45 | (2011.01) |
| H04N 21/462 | (2011.01) |
| H04N 21/475 | (2011.01) |
| H04N 21/482 | (2011.01) |
| H04N 21/84 | (2011.01) |

(52) U.S. Cl.
CPC ......... *H04N 7/163* (2013.01); *H04N 21/4135* (2013.01); *H04N 21/41422* (2013.01); *H04N 21/4532* (2013.01); *H04N 21/4622* (2013.01); *H04N 21/4751* (2013.01); *H04N 21/482* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 5,504,928 A * | 4/1996 | Cook et al. ................... | 710/62 |
| 5,912,696 A | 6/1999 | Buehl | |
| 6,351,596 B1 | 2/2002 | Ostrover | |
| 6,529,198 B1 * | 3/2003 | Miyauchi ..................... | 345/505 |
| 6,578,203 B1 * | 6/2003 | Anderson et al. ............ | 725/141 |
| 6,684,257 B1 | 1/2004 | Camut et al. | |
| 6,757,906 B1 * | 6/2004 | Look et al. .................... | 725/45 |
| 7,136,874 B2 * | 11/2006 | Mercer et al. ................ | 707/693 |

(Continued)

FOREIGN PATENT DOCUMENTS

| | | |
|---|---|---|
| WO | 01/39494 A1 | 5/2001 |
| WO | 03/098914 A2 | 11/2003 |

*Primary Examiner* — Tyler J Torgrimson
(74) *Attorney, Agent, or Firm* — Gottlieb, Rackman & Reisman, P.C.

(57) ABSTRACT

Content is received by a device through a port and is analyzed based on a set of predetermined criteria to determine if it matches the characteristics of the device and/or the preferences of a user. The content characteristics are recognized by analyzing the content itself or from tags attached to, associated with or embedded into the content. Acceptable content is then rendered to the user.

15 Claims, 10 Drawing Sheets

(56) References Cited

U.S. PATENT DOCUMENTS

| | | | |
|---|---|---|---|
| 7,155,436 B2 * | 12/2006 | Hegde et al. | 709/231 |
| 7,174,512 B2 | 2/2007 | Martin et al. | |
| 7,284,046 B1 | 10/2007 | Kreiner et al. | |
| 8,379,880 B2 * | 2/2013 | Riedl | 381/107 |
| 2001/0051559 A1 | 12/2001 | Cohen et al. | |
| 2002/0053084 A1 | 5/2002 | Escobar et al. | |
| 2002/0056102 A1 | 5/2002 | Dillon et al. | |
| 2002/0059619 A1 | 5/2002 | Lebar | |
| 2002/0128740 A1 | 9/2002 | Gage | |
| 2002/0138838 A1 | 9/2002 | Peters et al. | |
| 2003/0023638 A1 * | 1/2003 | Weight | 707/526 |
| 2003/0028890 A1 * | 2/2003 | Swart et al. | 725/91 |
| 2003/0145331 A1 | 7/2003 | Escobar et al. | |
| 2003/0208763 A1 | 11/2003 | McElhatten et al. | |
| 2004/0148226 A1 | 7/2004 | Shanahan | |
| 2004/0221308 A1 | 11/2004 | Cuttner et al. | |
| 2006/0112167 A1 * | 5/2006 | Steele et al. | 709/206 |

* cited by examiner

| DEVICE | TEXT | LOW RES IMAGES | HI RES IMAGES | HDTV | MONO SOUNDS | STEREO SOUNDS | 6CHN SOUND |
|---|---|---|---|---|---|---|---|
| WATCH-PDA | Y | N | N | N | N | N | N |
| HAND-PDA | Y | Y | N | N | Y | Y | N |
| CELLPHONE | Y | Y | N | N | Y | Y | N |
| LAPTOP PC | Y | Y | Y | N | Y | Y | N |
| DESKTOP PC | Y | Y | Y | N | Y | Y | S |
| HOME THEATER | S | S | Y | Y | S | S | Y |

S=selectable option

FIG. 4

METHOD, SYSTEM, AND APPARATUS FOR RECEIVING, PROCESSING AND RENDERING CONTENT RESPONSIVE TO USER AND DEVICE PARAMETERS

RELATED APPLICATIONS

This is a continuation of the U.S. Ser. No. 10/989,833 filed Nov. 16, 2004, now abandoned which is a continuation-in-part of the U.S. Ser. No. 10/977,634 filed Oct. 29, 2004, now U.S. Pat. No. 7,805,453, all incorporated herein by reference.

BACKGROUND OF THE INVENTION

Field of Invention

This application pertains to a personal video recorder (PVR) coupled to one or more rendering devices and method of operating the same for receiving, processing, and presenting content responsive to the capabilities and limitations of the rendering device, as well as user preferences, and other criteria.

Description of the Prior Art

Presently, content of various kinds can be received over various channels and presented in various formats. One problem that still persists in this field pertains to the fact that, in some instances, content receivers and other similar devices are unable to process content because of their specific capabilities and limitations. That is, certain content receivers are suited to process only certain types of content, and can either present or render other types of content very poorly, or cannot present them at all. For example, a user may have as a receiver a relatively inexpensive desktop computer with a simple, low definition (e.g., 600×800 pixels) black-and-white monitor and no speakers. This receiver does not have the capability of receiving or playing a program comprising HD video and 6-channel sound.

Another user may have a receiver such as a PDA incorporated into a wristwatch that has the capability of receiving only text messages. This type of receiver device cannot, by itself, process content with non-textual materials, such as still or moving images, or even sounds.

In other instances, a user may have a device capable of receiving various types of content but at least in some instances, he may be interested receiving only content having a certain format and not others. For example, a user of a cellular telephone may be interested in receiving text messages while attending a meeting, even though the cellular telephone may have the capability of receiving audio programs, or even still or moving images. Similarly, a visually impaired user may require that visual and/or textual content be presented as audio signals. Similarly, the driver of an automobile may want to receive at times content only in the form of audio. At other times, other passengers within the same vehicle may want to get content of other kinds of as well.

Another problem is that devices are often unable to determine user preferences. In some situations, the user himself may prefer to receive, store, or play only certain types of content and not others. For example, a user may only be interested in news segments that relate to a certain topic, such as gardening, but is unable to have player devices automatically extract and present only those segments of interest in a larger video program. In another example, similar to e-mail filtering, a user may wish to establish different rules for playing content, such as "view ASAP" or "route content X to folder Y for later examination and possible playback", and the like.

Yet another problem is that consumer devices must typically be targeted at rather low price points, and as such may not incorporate powerful processing capabilities. In these and other cases, and for other reasons such as providing better quality of service and reducing the traffic in content delivery networks, it may be desirable to shift the burden of content filtering to devices within the delivery networks themselves.

For example, so-called "content smart switches", such as the Cisco CSS 11000 series, can access information deep in TCP and HTTP packet headers, including, for example, the complete URL and "mobile" cookies that change location within the header between content requests, to select the best site and server to fulfill customer information requests.

SUMMARY OF THE INVENTION

The system described in this application includes filtering (transforming, or even just discarding) multimedia information, based not only upon such descriptors as transport-level packet headers, URLs, or cookies, but also upon what is normally considered the application level data within the packets. The invention describes such filtering and related processing in accordance with the receiving device and/or user capabilities and/or user preferences, using a PVR as the filtering means.

The invention also includes optionally locating such filtering capability within devices that reside within the content delivery network, (as "part of the network" and/or as third party servers) wherein said devices act as "mediators" that filter content based upon tags and/or user and/or device capabilities and/or user preferences.

In one embodiment, the content being filtered is a web page that may contain either subject matter that is desirable or subject matter that is not desirable at least for some of the users.

BRIEF DESCRIPTION OF THE DRAWINGS

FIG. 4 shows a table indicating characteristics of various receivers;

DETAILED DESCRIPTION OF THE INVENTION

Figure 1:
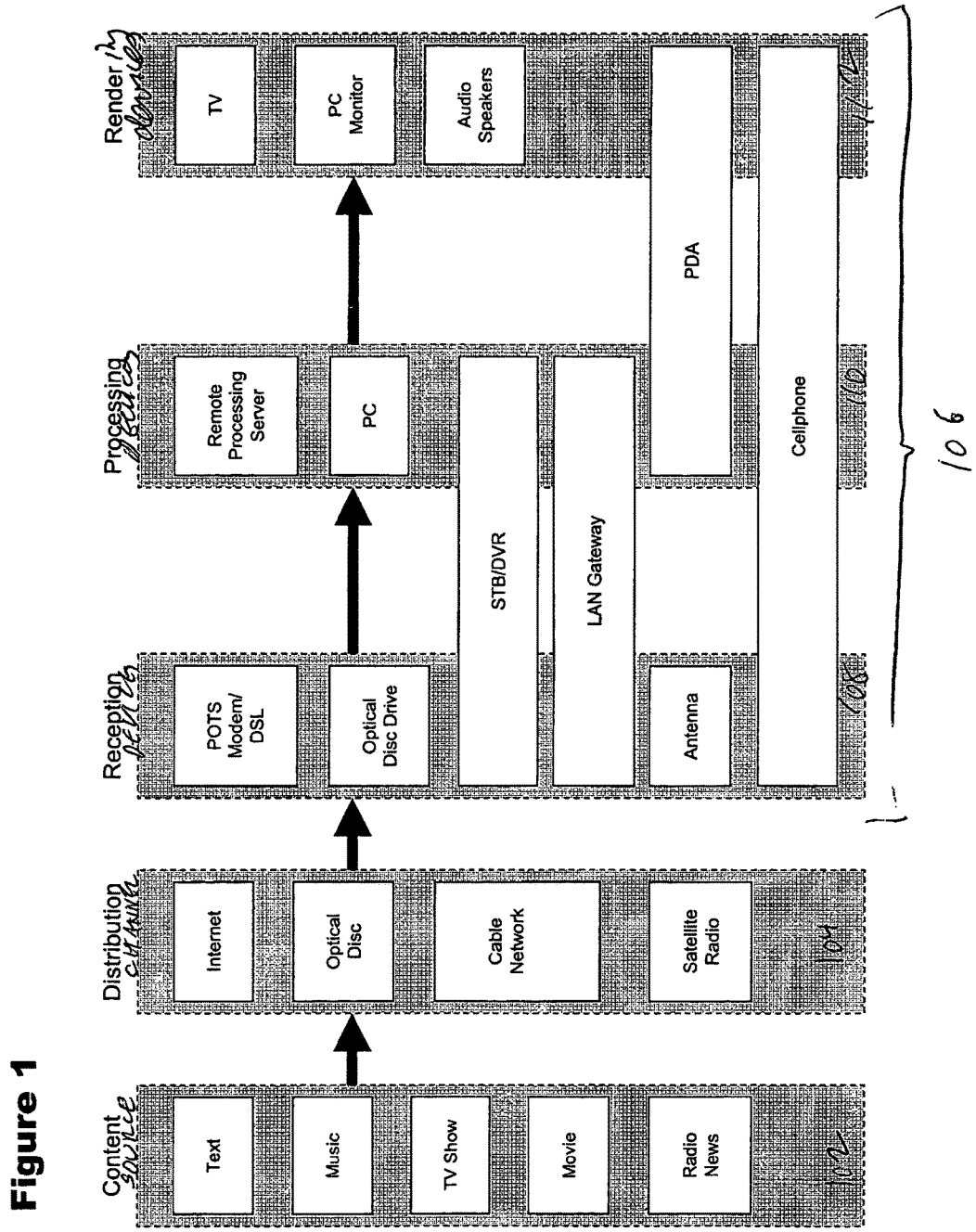
FIG. 1 shows a general block diagram of a system according to this invention with different types of content from different sources being received, processed, and presented to a user.

In this application, "content" refers to the wide variety of types or kinds of media used to transmit information and entertainment to people, such as still photographs, motion pictures, videos, audio, text, graphics, drawings, and multimedia combinations of these. "Content" is meant to broadly describe media data independent of physical or logical data format or method of distribution or reception. Content types may be in any physical or logical formats, such as JPEG photographs, MPEG video, audio signals (that could be analog or digital, and may be in a number of different presentation formats, e.g., mono, stereo, multi-channel, MP3), HDTV, DVD-Video, HTML or any other format used to describe, contain or otherwise convey media data. Finally, content is meant to include both cohesively or continuously presented media data, such as a mixed audio-video presentation such as a TV news program, as well as selected portions or excerpts, re-edits of otherwise larger or longer presentations, such as the audio portion, or certain non-contiguous snippets or extracts of a larger TV show. Content may be analog or digital.

Content may be delivered using any transfer method, including recording on a physical storage or portable means such as optical disc or cassette tape, by networks such as the Internet or other online services, and by broadcast such as cable, telephone lines, cellular telephones, satellite communications and various other communication channels. These channels provide diverse means by which a large variety of content from various locations and sites can be accessed. Furthermore, content may be formatted for delivery as a single discrete digital file, in analog form, in several discrete segments or by streaming such as Internet-based digital radio.

A user site is a physical location (that is not necessarily stationary) equipped with a system for receiving, processing and rendering content. As described more fully below, the system at each site consists, in most embodiments, of several devices cooperating to perform one or more of the functions described in order to receive, process and render content to one or more users.

Content can incorporate or be associated with one or more tags or other similar means that includes relevant information. For example, the tags may provide information about the subject matter of the content and/or its type and form of presentation (e.g., whether the content is an audio-visual presentation of a Wagnerian opera, an aural sports report, a text with stock prices similar to a ticker tape, etc). Thus, tags may include data identifying the content by subject matter, title, author, actors, location, etc., the type of content (e.g., whether the content is a multi-media presentation suitable to be shown on an HDTV or black-and-white text that can be displayed in a tiny screen), the type of transport medium (e.g., a Sony DVCAM digital video tape, standard DVD disc, streaming audio, etc) and the type of content format (e.g., an MPEG Audio Layer 3 music file or an Advanced Audio Codec music file). Alternatively, some of the information such as the type of transport medium or content format, can intrinsically provide additional information, such as picture resolution, frame rate, and other factors.

The content tags may also include indicia such as a rating indicating whether the content contains material in accordance with user preferences (for example, materials related to violent or sexually explicit activities). As disclosed in my U.S. Pat. No. 6,351,596, content can also be partitioned into several segments, such as scenes, and each segment can be associated with its own rating tag.

Tags may be embedded in analog media—for example, in the vertical blanking interval of an NTSC video signal—or in wholly digital media, such as in a header to a content file, or in a separately provided file, or incorporated within the content object itself, e.g. as stegotext or a watermark.

Devices that play content may use the tags to affect how and whether the content is processed, stored, presented, or played. Examples of this are digital video recorders such as the TiVo Series2 DVR and the Scientific Atlanta Explorer 8000 DVR. In general, these devices can automatically collect and store broadcast programs that meet user criteria, such as storing all received broadcasts that include the actor Rutger Hauer or storing all first-run episodes of the cable television program "Six Feet Under".

As disclosed in U.S. Pat. No. 6,351,596, a user or content receiver player may review rating tags prior to processing, storing, or playing content. A receiver may be provided that can be configured to collect for play or storage content with desirable ratings or tags, and to reject content with undesirable ratings or tags. In the case of content with ratings or tags for different segments, a receiver may be configured by a user so that it plays only the segments of the content that have acceptable ratings or tags. Another well-known example of this is the "parental lock" feature of certain televisions or other video viewing devices, which is intended to prevent children from seeing content unsuitable for minors.

In accordance with this invention, in the present system content undergoes several transitions or steps. All content originates from a respective content source and is ultimately distributed to a user or users at one or various user sites. In one embodiment, at each user site, the content is received, processed, and then rendered in a form perceivable by the user(s), in accordance with the content's characteristics that can be determined implicitly from content and/or metadata or additional tags. In another embodiment, content is received from the content source and processed at a remote site before being forwarded to a user site, where it optionally undergoes further processing before being rendered. Tags are significant because they provide information that enables the system to more flexibly and powerfully handle the content, including various functions such receiving, filtering, selecting, storing, prioritizing, transforming, rendering, and presenting the same in light of specific attributes, directions, rights, preferences, etc., in the tags. For example, in a player similar to that discussed in my U.S. Pat. No. 6,351,596, tags can be used to skip undesired parts or play only desired parts of a program. In another embodiment, tags can specify playback at a later time, repeated playback of certain program segments, interposing of segments of other programs from local or remote sources, or the like, or any other nonlinear player actions beyond playing a program linearly from beginning to end.

For example, tags may be employed to cause a processor to transform incoming digital video content form MPEG4 to MPEG2 format. In another example, tags may specify that the incoming information should be converted from text to speech or vice versa. In yet another example, a tag could specify that the incoming video should be summarized (only the highlights, e.g. 'thumbnail' frames of video from longer programs, or a line of text from longer text for presentation) before being sent to the player and thence to the user.

In another example, tags may be used by the receiver to reject content based upon user preferences. Tags may also be used to cause the receiver to "retune" to a different information stream, including selecting a substream of an incoming digital stream and/or retuning in the classical sense of monitoring a different frequency band. In fact, multiple tuners or other receiving means could monitor and record multiple channels or 'information streams' simultaneously, e.g. the new Sony Vaio shown at CEATEC recently that can record seven television channels simultaneously.

A tag may cause both the receiver and player to operate in synchronism, to achieve the effect of, for example, "splicing together" a program from segments from different information sources. For example, several incoming programs may have segments that are tagged as being of interest for Bob Dylan fans. The user site has a digital token identifying the user as a Bob Dylan fan. Therefore, at the user site, the receiver and player cooperate to record and splice together segments from different programs which have the Bob Dylan tag discussed above. In this case, a match between tag-token associated with the user site and tags from content from different sources drives the processing of the content. Some of the tag-assisted processing may be conditioned on certain events, e.g., of the form "if then" or "if and only if then" etc. A token may denote age, genre preference, rights, privilege, preferred source(s), preferred media type (e.g. mono), etc.

FIG. 1 shows a system 100 for receiving, processing and presenting content responsive to specific device capabilities and limitations, user capabilities and limitations, user preferences, and other criteria. As indicated in the Figure, content originates from a plurality of sources 102. The sources save content of various types, including text, music (sound), TV shows (audio/visual), movies, radio news, etc.

The content is provided to several distribution channels 104 that may include Internet, Intranet, channels, cable networks, WiFi, Bluetooth, broadcasting over the air or via a satellite network, etc. All these distribution channels transmit the content to the user sites 106 electronically. The distribution channels 104 may be one-way, such as in terrestrial analog broadcasts of TV or radio, and they may be two-way, such as with wired or wireless Internet access via DSL, cable, or "plain old telephone services" (POTS). In the case of two-way channels, content may be actively searched for and "pulled" by the user site 106 in response to search criteria. In other instances, the content is pushed by mass broadcast to the user sites. Typical push-type channels including broadcast channels.

Another means of distribution includes recording the content on a physical medium and transporting the medium to the user site 106.

The user site 106 includes one or more devices that perform three functions: receiving the content from the distribution channel, processing the content and rendering or presenting the content in a manner that is perceived by the user. FIG. 1 shows sources 102 of content, content distribution channels 104, and a site 106 with reception devices 108, processing devices 110, and rendering devices 112 performing these functions. In some embodiments, each of these functions is performed by a separate device. In other embodiments, for example, two or even all three functions are combined in a single device. For example, the user site could include a home computer with the receiver device being a POTS or a DSL modem, the processor is the PC itself and the rendering devices are the PC monitor and PC speakers. If the user site includes a recording device such as a DVR (digital video recorder), a LAN gateway, or a standard VCR, then these latter devices perform both the receiving and the processing functions, and a standard TV (or a high definition screen) performs the rendering function.

If the user site consists of a PDA, the receiver device comprises an antenna, demodulator, decision device, and possibly forward error correction decoder and decryptor, and the PDA performs the processing and rendering functions.

If the user site is a cellphone, then the cellphone could perform all three functions. Alternatively, the processing function could be performed entirely or in part by a remote site.

One of the functions that is performed as part of processing is that of gating. The gating process refers to the ability of the user site to process and transmit to the rendering device only content that meets certain criteria. Alternatively, the gating process can be considered to be a filtering process which admits some content and rejects other content, again, based on predetermined criteria. Some of these criteria, and how gating is performed is discussed in more detail below.

Canvassing is also part of the processing function. Canvassing refers to the process of monitoring the content being received to detect aspects of the content in accordance with user preferences and/or device characteristics. Even in push/broadcast mode, there are many potential sources and the user site needs to canvass all these signals for content of interest. Such material and/or related material could then be selected for further processing and/or storage and/or presentation. This can be a two-dimensional process in the sense that a plurality of media (e.g. terrestrial analog radio, satellite digital radio, Internet radio) need to be canvassed across their own frequency spectra.

Finally, as part of processing, if different content is retrieved from several sources, as part of the processing function, each content item is assigned a priority in accordance with user preferences and/or device characteristics. The content is then rendered based on an ordered list generated in accordance with the priority of each content item.

Processing may also involve transforming content from one format to another, if required. This function is required when the content is in an incompatible format. For example, if the content and the rendering device (e.g., the TV monitor) have different resolutions, then the content may have to be up-converted or down converted to match resolutions. Other transformations may involve folding 5.1 or 6 channel sound signals into stereo sound signals or converting content from one format to the other (e.g., spoken word audio to text, or vice versa). Of course, in the alternative, incompatible content may be filtered out or rejected.

Figure 2A:
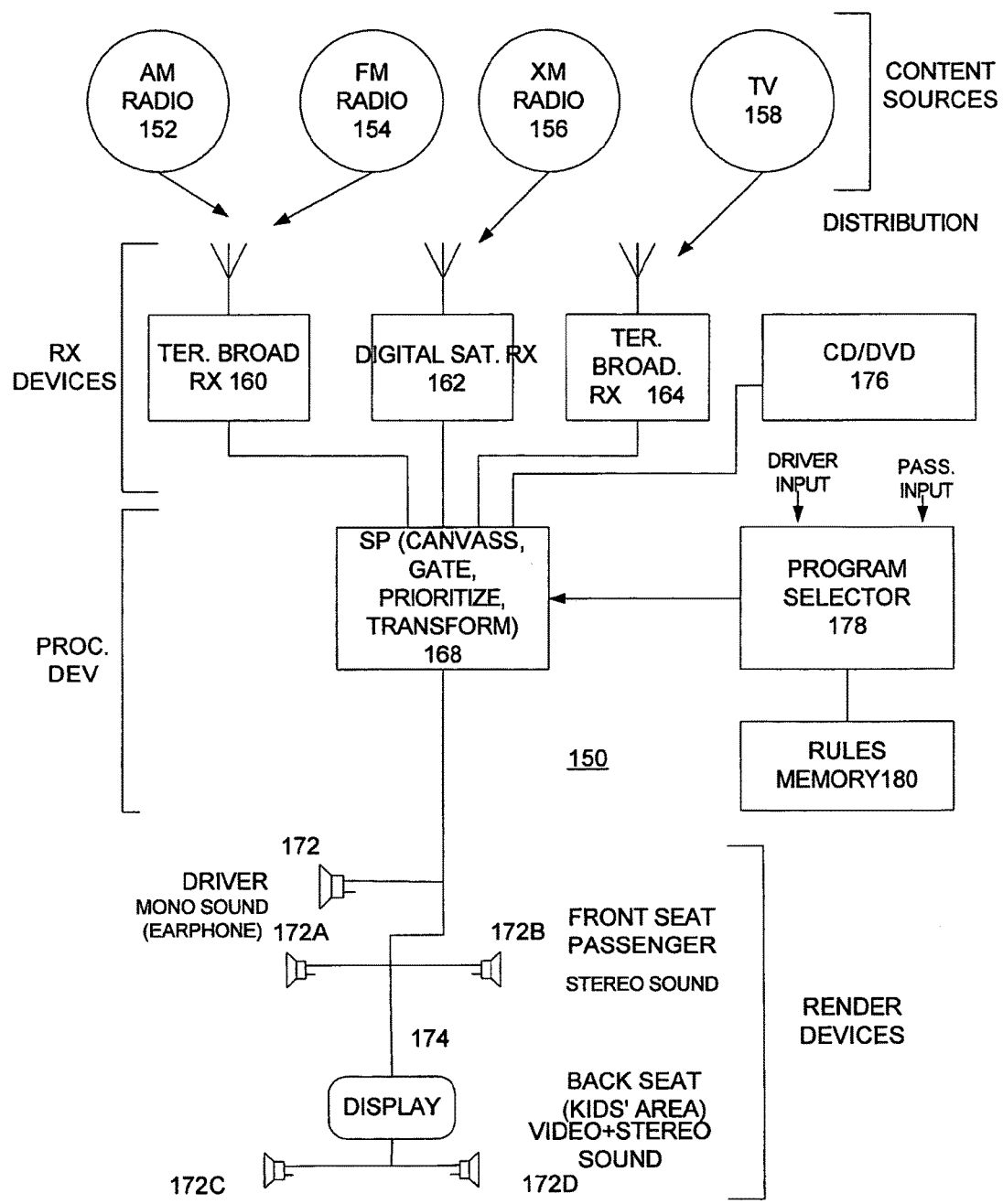
FIG. 2A shows a system constructed in accordance with this invention that is incorporated into a "minivan" motor vehicle.

FIG. 2A shows the elements of a first embodiment of the invention consisting of an entertainment system 150 in a car, truck, boat, plane or other motor vehicle. The system 150 is arranged and constructed to receive several types of programs, such as terrestrial broadcast standard AM and FM signals, and other signals available from the broadcasters 152 and/or 154 and/or 156 and/or 158. For this purpose, the system 150 includes a plurality of receiver devices adapted to receive the signals from one or more of these broadcasters. More specifically, the system 150 includes a terrestrial radio receiver 160 that receives standard AM and FM radio signals from the AM and FM sources 152, 154. The receiver devices further include a digital satellite radio receiver for signals from XM (or other, for example, Sirius) source 156 and a terrestrial TV receiver (or cable modem) 164 for signals from TV source 158. The system can manage more than one channel, even video, simultaneously.

System 150 further includes a signal processor (SP) 168 that processes the signals from the receiver devices discussed above. As part of this processing, the SP 168 performs canvassing, gating, prioritizing etc., as discussed above. The system 150 further includes a CD/DVD player 176, a program selector 178, and a rules memory 180. The program selector receives selections from a user, such as the driver, and/or one or more passengers. The rules memory 180 defines the rules needed by the SP for the canvassing, gating, signal transforming, and prioritizing functions. Signal conditioning and other signal processing required to convert the signals from the receiver devices into output signals suitable for presentation by the rendering devices (discussed below) are also provided by the signal processor 168. The signal processor 168, program selector 178 and memory 180 comprise the processing devices described in FIG. 1. The CD/DVD player 176 serves a dual purpose. It's a receiving device and a processing device.

Several devices are also provided for presenting or rendering content to several users within the motor vehicle. One of these devices is a speaker (or earphone) 172. This speaker is positioned so that services primarily the driver. A pair of stereo speakers 172A, 172B are positioned so that they provide sounds both to driver and the passenger sitting next to the driver. Another set of speakers 172C, 172D are placed to provide sounds to passengers in the back seat. Finally, a display 174 is also provided. Preferably, the display 174 is positioned so that it is viewed primarily from the backseat, although it may also be positioned so that it is also viewable by the passenger in the front seat and the driver. The program selector 178 generates commands and designates criteria used by the signal processor 168 to describe which programs, or portions thereof, to accept or reject. These commands or criteria are generated by the program selector in response to rules found in the rule memory 180 as well as in response to input signals from users, including, for example, the driver of the motor vehicle, and/or a passenger.

The system 150 can be used in several operational modes. For example, for short trips, the driver wants to hear information related to a small group of subjects, such as weather, travel and road conditions, and the latest news and stock market reports. These rules and preferences are either selected by the driver or prerecorded in the memory 180. The rules may also require that in this mode, all inputs from the passenger(s) be ignored. The signal processor 168 then selects content known, designated or tagged to meet these criteria. For example, the signal processor 168 selects the AM radio stations designated as carrying news, weather, etc. Moreover, the signal processor 168 provides only low quality sound files suitable for the single speaker 172 since high quality stereo sound is not required in this instance.

At another time, the vehicle is used by one driver and several passengers to go on a long trip. The passengers include some adults who like classical music, some other adults who like shows about gardening and adolescents who like children's stories. This information is again received by the program selector 178 from the passenger input and/or from the rules memory 180. The signal processor 168 searches all the content from the different sources and displays them in a suitable form. That is, the stereo speakers 172A, 172B, 172C, 172D which may, for example, actually comprise multiple sets of speakers embedded into seatbacks or headphones to prevent the sound from each set of stereo speakers used by one vehicle occupant from disturbing other occupants of the vehicle, are used to play stereo sound, the display 174 is used to show video signals, and so on. In this mode, the front occupants can listen to one content and the passengers in the back seat can listen and/or view another content.

In another instance, the motor vehicle is a trailer parked overnight, and all the occupants decide to watch content together on the display 174. Some of the occupants are children. The preferences of the occupants are entered or prerecorded, the signal processor searches for content matching these preferences, and receives content from several sources. The signal processor then selects the content to be rendered based on the rules and priority selected. The tags of the content segments are also monitored by the signal processor 168 and segments with objectionable content are omitted.

Many other rules can be formulated based on different conditions such as the weather, the presence of passengers, the time of day, and many other criteria can be used to define a large number of rules for the operation of the vehicle's multimedia reproduction system.

If more than one content item is available at any one time that meets the criteria set forth by the program selector, then the content is either played in a preselected sequence (determined for example by rules in memory 180—e.g., children's stories played first, followed by gardening programs, and then classical music), by arranging the content in hierarchical order and playing only the top "N" content files, or by using a random rule, or using other criteria. As discussed previously for step 362, a listing or 'menu' of the items could also be provided to allow users to select what to schedule what to play in what order. If the system supports simultaneous playback of multiple content, then multiple content, and/or portions thereof, may be played simultaneously. e.g. video or stills from one source and audio from another. If no content is available on line, or if it is so preferred, content is played from CDs or DVDs using player 176.

Figure 2B:
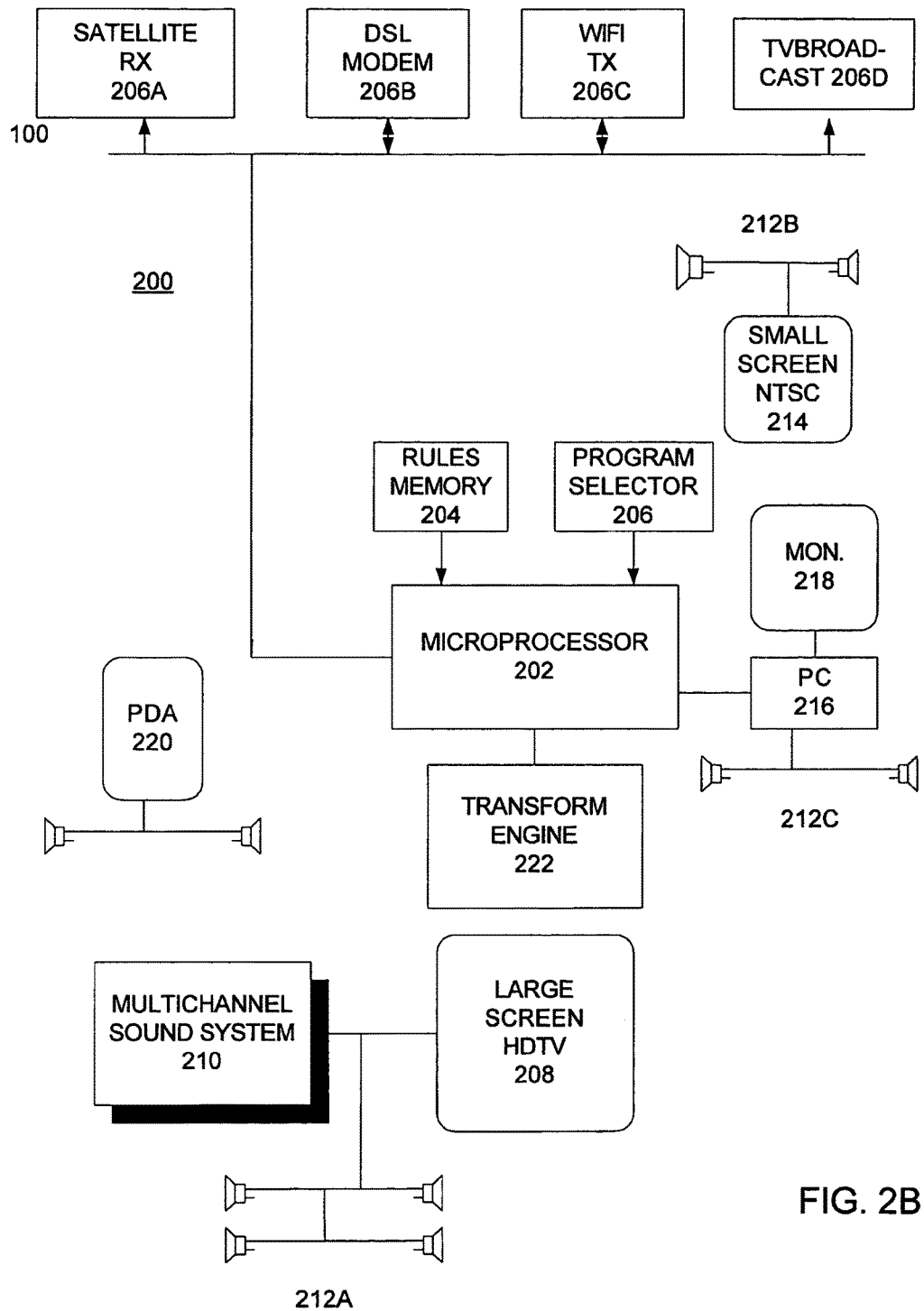
FIG. 2B shows a system constructed in accordance with this invention that is embodied as a multimedia home network.

Another system 200 is shown in FIG. 2B. The system provides content to users in a private home or other site occupied by one or more users. The system 200 includes a microprocessor 202, and a plurality of receivers 206A-D for content from various sources. For example, receiver 206A is a digital satellite radio receiver or a satellite dish receiving multimedia program files. Receiver 206B is a DSL modem, providing an Internet connection. Receiver 206C is a WiFi device receiving program files from a local area network through a wireless connection. Receiver 206D provides the interface with a cable network through which the system can receive Internet service and/or various cable services. These receivers are only some of the devices that can be provided for the system for receiving content. The system may be arranged and constructed as a modular system with the number and types of receiver devices being a customization option selected by the user based on his preferences, local services availability in the area, the types of programs available from each service, and other similar criteria. Moreover, the user can add or remove receivers (and other devices and components) at will.

Rules for operating the system are stored in a rules memory 204.

The users enter their preferences and other information in a program selector 206. The system 200 includes several devices that are individually operated by users to obtain the desired contents. Different users may operate the various devices at different parts of the site, or, in some instances, even from the same part. One such device is a large screen HDTV 208. This device may be situated, for example, in a den. Also in the den is a multichannel sound system 210. The sound system 210 can be used to listen to multichannel sound programs, including operas, rock concerts, etc. Or, the sound system 210 and the HDTV screen 208 are used together to view movies or other presentations. Either or both devices 208, 210 are coupled to a set of matched speakers 212A used to deliver multichannel (e.g., 5.1 or 6 channel) audio signals.

In a different part of the house, for example, the kitchen there is provided a small screen TV set 214 playing signals in the NTSC format. Associated with this TV set 214 there is a second set of speakers 212B which delivers lower quality stereo signals. This TV set may be used to provide news shows, soap operas, recipes, etc.

A PC 216 with a monitor 218 and another speaker set 212C is located in an office.

Finally, a PDA or hand-held device 220 is available at the site. The device has its own set of earphones 212D and can be used to listen to various audio signals. It communicates with the microprocessor 202 through a WiFi channel, an IR link, a Bluetooth link, or other wireless means.

The system 200 can be used to receive and render a large variety of content. The content is preferably collected by the microprocessor 202 from the receiver devices 206 and delivered to the individual devices for rendering. In this system, the processing is shared between the microprocessor and each individual device. Rendering is performed by the speakers 212, and/or the various screens described. Importantly, based on the rules from the rules memory 204 and/or the tags associated with the content, the content is distributed to each device based on (A) the capabilities and limitations of each device; and (B) the preferences of the users. For example, on a Sunday afternoon several users may decide to watch football games in the den. The microprocessor 202 runs a search and finds loads of content on football, starting with text messages from individuals, newspaper articles with black-and-white pictures, magazine articles with color pictures, low quality audio streaming programs from AM stations, low quality video signals from various sources and HD quality video signals from other sources. The microprocessor 202 rejects all content that is not suitable for the HDTV screen. At the same time, another user is in the office collecting materials on football for a paper. He is presented with the newspaper and magazine articles with the pictures. Meanwhile, or at another time, another user wants to see a cooking show on soufflés in the kitchen. The microprocessor 202 sends to the TV 214 only low quality programs audio-visual programs. The PDA 220 is used to play musical selections, training programs or other audio signals that are stored in its own memory (not shown) or are sent to it by the microprocessor 202.

In the embodiments of FIGS. 2A and 2B discussed so far, the content is played in its original or native form. In an alternate embodiment, a transform engine 222 is provided, which selectively transforms content from one form to another. For example, text may be transformed into voice messages and vice versa, multi-channel audio signals may be folded into stereo (dual) channel or even mono channel signals, HDTV signals may be converted into NTSC TV signals, and so on. The transform engine 222 may be preprogrammed and standard algorithms may be used for these transformations, in conjunction, optionally, with a table. The table then provides references on what algorithm to use for which original content.

In an alternate embodiment, content may be stored with an attachment that includes program code defining the alternate forms to which the content can be transformed and/or the algorithms that are to be used for transforming the content. In some instances, standard transformation algorithms are stored in the transform engine that may require some transformation parameters. These transformation parameters may be stored together with the content and distributed therewith. Alternatively, the parameters may be obtained separately at a later time.

The content transformation may be performed automatically, e.g., and the transformed content may be cued to follow the presentation of native content, or may be mixed with any native content in any order. Alternatively, when the user wants to get a content at some device, for example, he may receive a message indicating that content in a different format is also available and he is asked to chose whether he wants to have the content transformed and then rendered, or not.

In an alternate embodiment, content is stored and distributed in an encoded or encrypted form that, optionally, may require an activating key. In this manner, a content publisher can safely distribute content without fear of piracy. After the content is received by the microprocessor 202, a known algorithm is used to decode and/or decrypt the content, using the key (if necessary). The content is then sent to the proper device for rendering.

In other instances or embodiments, the content may include one or more algorithms to selectively decode, decrypt or otherwise generate plain (unencoded) content in one of several formats. The format may be selected by the user, or it may be determined by the key supplied. For example, the same content with the proper transformation could be rendered as a HDTV presentation or as a low quality NTSC presentation. The choice may depend on what the user paid for. Alternatively, the content may be supplied with the dialog in a variety of languages. The key provided by the user then selects the language for the dialog.

In the embodiment of FIG. 2B, all the processing is performed at the user site 200. However, some of the processing, especially, processing requiring a lot of computing power (such as the transform engine) could be performed off site. Therefore, the cost of the equipment at the user site could be reduced. Moreover, since some of the processing involves proprietary software and/or manipulation, processing off site (either by the content publisher or a third party) provides much better security and much less chance of piracy or corruption of the content.

In another embodiment, once content is identified by canvassing, the user may require it to be processed further. For example, in some instances, the user may want the content to be 'sanitized' (another form of transformation) by removing objectionable scene or language. Moreover, the user may prefer to have this processing done off site for example by a third party. Content may also be scheduled for processing and/or presentation at later times, as discussed below.

Figure 2C:
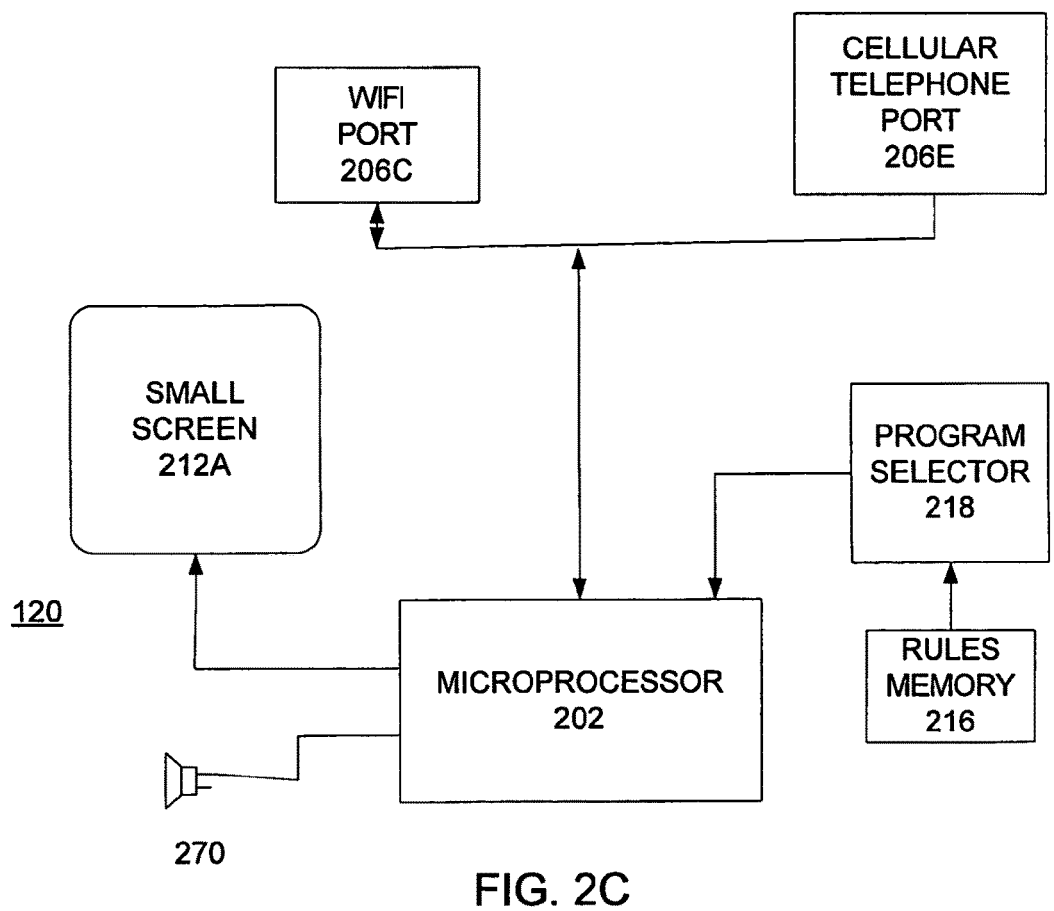
FIG. 2C shows a block diagram of a block diagram of a player implemented in a PDA or cell phone.

FIG. 2C shows yet another embodiment. In this embodiment, the user site consists of a single receiver or player device 120 such as a small hand-held device. Device 120 may be a PDA, a music player such as an IPOD, and/or a cellular telephone. The device communicates with the outside world through a WiFi transceiver 206C and/or a cellular telephone transceiver 206E. The program selector 218 is used to select or search for content and rules from rules memory 216 are used to determine when the content is desirable or suitable for rendering by the device. Once content is accepted, it is sent by the microprocessor 202 to speaker 270 and/or small screen 212. Inherently, this device 120 is capable of handling only a small amount of text, small pictures, and low fidelity sounds and only content meeting these criteria can be rendered. Alternatively, the content is transformed, as discussed above into a renderable form.

Figure 3:
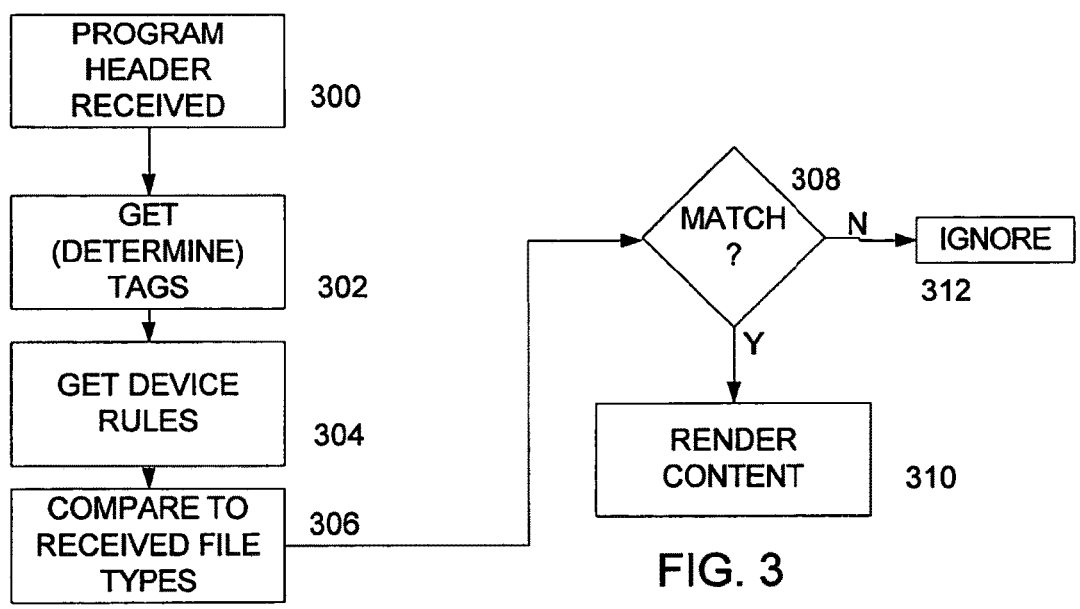
FIG. 3 shows a flow chart for the operation of the device of FIG. 2A.

One mode of operation of the receiver device of FIG. 2B is shown in FIG. 3. For this mode, it is assumed that a program is either pulled in response to a request by the user, is being pushed, or is presented in some other manner through one of the receivers 206A-D. The program starts with a header that normally includes certain tags that characterize the program type. In step 300 the gate 204 receives the header. In step 302 the tags are analyzed to determine the characteristics of the program. If the header contains no tags, (or if the program file has no header at all) then as part of step 302 the characteristics of the program are determined by the microprocessor 202. For example, during this step, the actual data bits of the program are analyzed to determine its characteristics. Alternatively, if the program is transmitted as a file, then the file extension is analyzed to determine its characteristics. If the file extension does not identify its characteristics, then a look-up table or a remote database is used to determine the program characteristics.

In step 304 the rules for the device are obtained. As discussed above, the device rules are determined automatically, are preprogrammed, or are selected by the user. Thus, the rules are dependent on the device characteristics (i.e., what kind of program files can the device process and display) and, optionally, the preferences of the user. These preferences may be permanent (e.g., the user may select to see programs about flowers but never about wrestling) or temporal/temporary (e.g., the user may indicate that he is in the mood for a ballet at a particular time, or every Friday night).

In step 306 the device rules and the program file types are compared. If the program type coincides with the device rules (step 308) then the program is possibly processed, and rendered or otherwise presented to the user in step 310. As part of this step, the program may also be saved for future presentation.

If no match is found in step 306 then the program is ignored (step 312).

The table of FIG. 4 illustrates some of the capabilities and intended uses of various devices receiving programs from the Internet. In this figure, the columns designate various types of programs: text, low resolution images, high resolution images, HDTV, mono sounds, stereo sounds, and multi-channel sounds. The table illustrates that some devices may be able to receive almost any kind of the program, while other devices are very limited in the type of program that they can receive. For example, a wristwatch PDA is generally meant to receive primarily text information only and it may not be capable of receiving images or sounds. A hand-held PDA and a cell phone (such as the one in FIG. 2C) generally receives text, some low resolution images and mono or stereo sounds. At the other end of the scale, a home theater (FIG. 2B) is capable of receiving every kind of content, however, generally, a user may not wish to see some programs, such as text, low resolution images, or low resolution sound, etc.

Yet, other devices, such as Internet radios or entertainment devices in cars (such as the one in FIG. 2A) can receive sound and process and/or play high quality sound. Car entertainment systems may have the capability of receiving some low resolution images, but the driver may obviously not be interested in these images and may request that these images be rejected.

Figure 5:
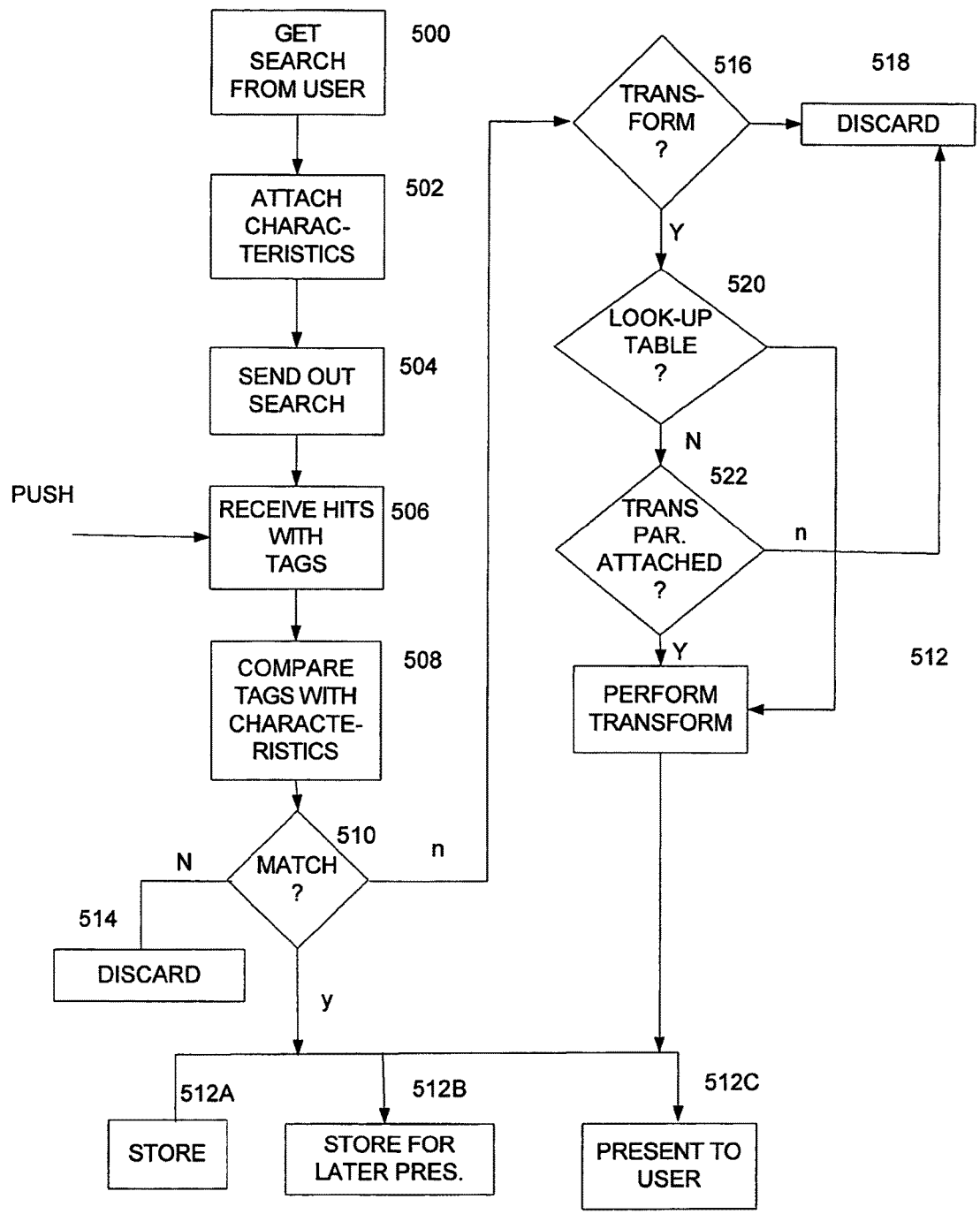
FIG. 5 shows a flow chart for an alternate mode of operation of the devices of FIGS. 2A, 2B.

As discussed above, the programs, or portions thereof, can be either pushed or pulled from the Internet and are then examined by the gate to determine whether they should be accepted and played, or not. FIG. 5 illustrates another specific mode of operation. In step 500 the device 200 receives a request for programs from the user. In step 502 the request is modified by attaching the device characteristics to it. More specifically, the search is modified to cover programs that are commensurate with the characteristics of the device. Thus, if the user requests information from a watch-type PDA that has very limited capabilities, the search could be limited to text-only programs, if the user so desires. Similarly, a request for content for a home theater could be limited to high quality content, including either HDTV or high res images accompanied by either high res or multi-channel sound.

In step 504 the search is sent out. In step 506 results of the search are obtained. These results include web site addresses and tags. The tags identify the characteristics of the programs, or portions thereof, on the respective the web site, i.e., whether the program, or portion thereof, is an audio file, a text file, a multimedia file, etc.

In step 508 the tags are compared to the characteristics of the device (FIG. 2A, 2B or 2C). In step 510 a determination is made as to whether there is a match between the device characteristics and the tags.

If there is no match then in one embodiment the content is discarded or ignored (step 514). If there is a match, the microprocessor can perform one of several different functions. For example, the microprocessor may store the content in a memory (not shown) for presentation at a later time (step 512A). In this embodiment, an index is generated for the user indicative of the content available for presentation. The user can then obtain this stored content at will. In another embodiment, the content is stored and the user gets an immediate announcement indicating that the content is available (step 512B) and requesting instructions as to whether the user wants to receive a presentation of the content immediately, at a later time, etc. Lastly, the content may be automatically and immediately presented to the user (step 512C).

In another alternate embodiment, if no match is found in step 510, an investigation is made to determine if the content should be transformed and fitted to the device characteristics and/or user preferences. For this purpose, in step 514, a check is performed to determine if a transformation process is desired and/or available. If yes, then a check is performed to determine if a transform table is available for the kind of the received content (step 520). If no table is available, then in step 522 a check is performed to determine if there are transform parameters or formulas attached to the content itself. If either there is transform table available, or if transform parameters are found with the content then in step 524 the content is transformed into another format that fits the subject system, either because it is compatible with the system characteristics or because it matches the preferences of the user. The transformed or new content is then handled in steps 512A, B or C in the manner discussed above. Otherwise the content is discarded (step 518) or ignored.

Of course, for a typical search it is expected that a plurality of hits are returned. Each of these hits is then analyzed as set forth in FIG. 5, and then all the surviving hits can be presented immediately or stored for later presentation to the user.

Figure 6:
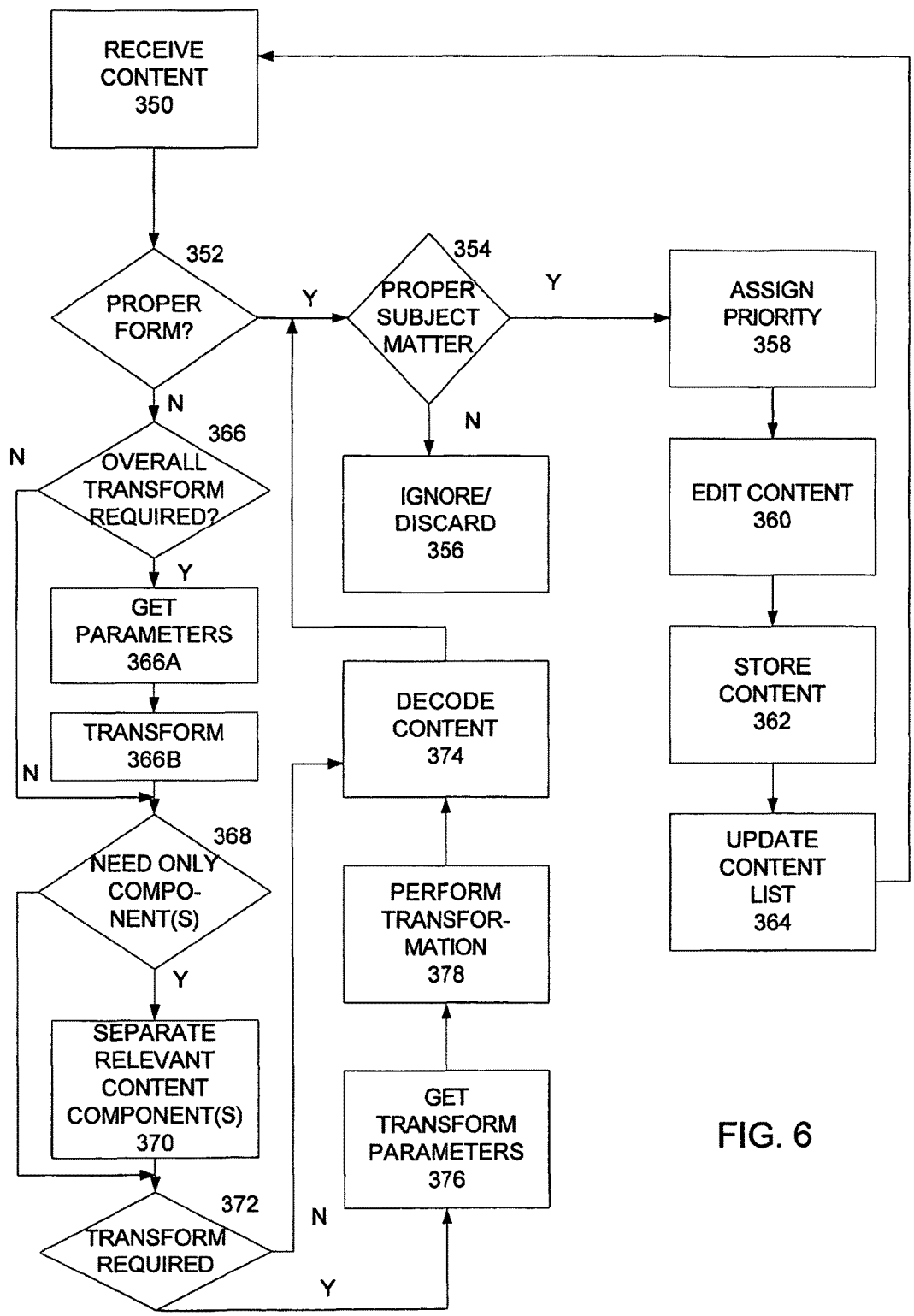
FIG. 6 shows a flow chart illustrating how content is received and processed.
Figure 7:
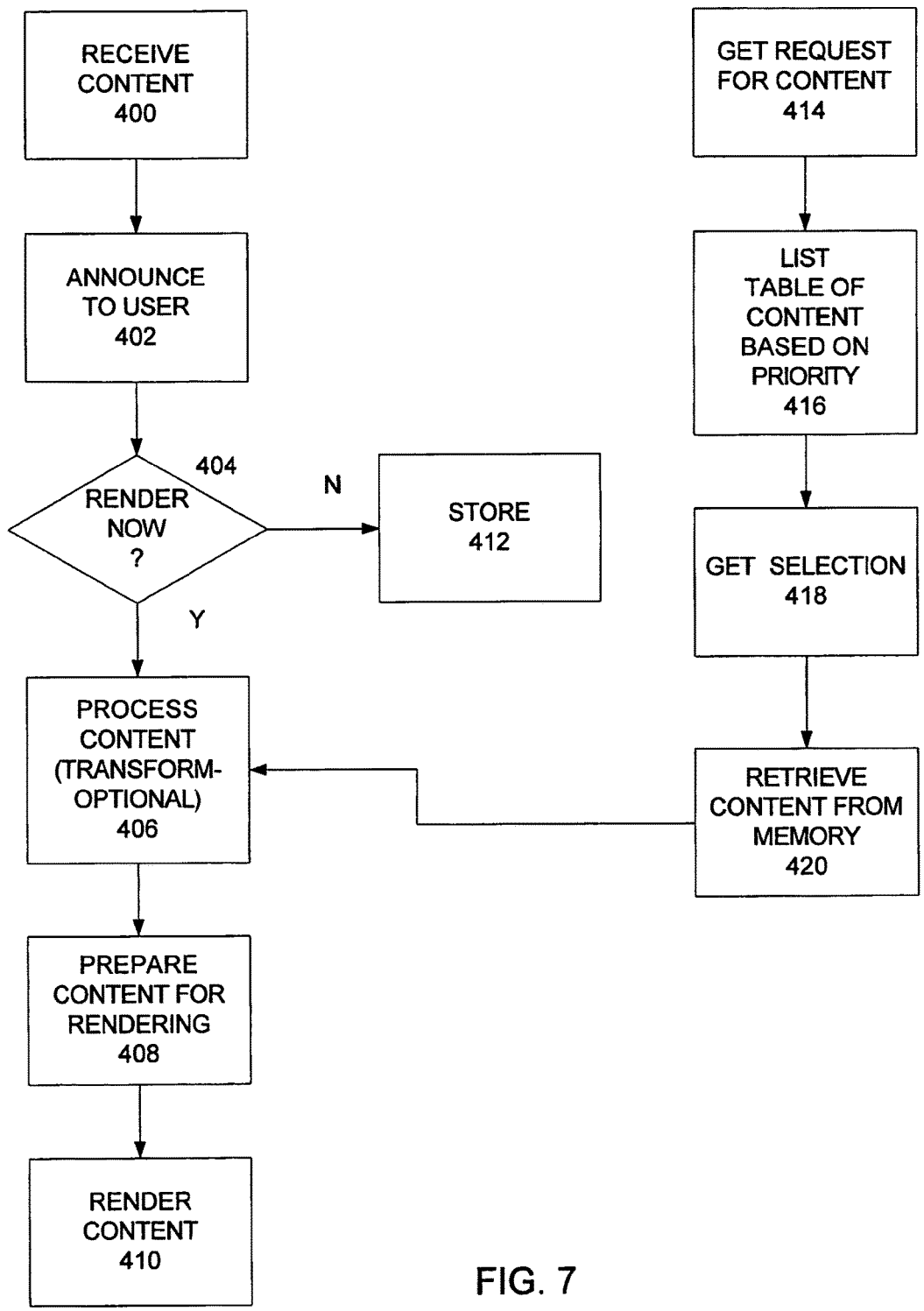
FIG. 7 shows a flow chart of a typical process for handling and rendering content by the devices of FIGS. 2A, 2B, 2C.

FIG. 6 shows some more details of how content is received and handled by the content receivers in accordance with this invention and FIG. 7 shows some details of how content is rendered.

In FIG. 6, content is received in step 350. For the purposes of this discussion, the content is received either in response to a search, or is pushed. In step 352 a check is performed to determine if the content is in the proper form, i.e., it matches both the characteristics and capabilities of the receiving device and, optionally, the preferences of the user.

If the content is in the proper form then in step 354 a check is performed to make sure that the content is the proper subject matter. In other words, this step insures that the content is responsive to a search, or otherwise suitable for the user. If the content is not proper subject matter, then in it is discarded or ignored in step 356. If the content includes proper subject matter then in step 358 it is assigned a priority. Priority may be selected based on a number of criteria that may be dependent on internal rules and/or selections by the user. For example, the user may indicate that he wants both audio and audiovisual materials, but audiovisual materials should be presented first. Alternatively, or in addition, content may also be prioritized based on the date on which created or received. Priority may also be based on authorship. For example, movies from one director may be assigned higher priority than movies from another director.

Next, in step 360 the content may be edited so that the time of presentation is reduced, and/or the amount of space required to store the content is minimized. For example, a content item may include a video presentation of how to grow several different types of flowers, but the user has previously indicated that he wants only content related to daisies. Therefore, in step 360 the content is edited by eliminating all the portions related to the growing of flowers other than daisies. Alternatively, the step of editing 360 could also include compressing the content to a more compact size.

In step 362 the content is stored and in step 364 a content list is updated by including an identification of the content that was just stored.

As discussed above, if the content is not in the proper form, it may be discarded or it may be transformed. The transformation process may be performed to fit the content to a form compatible with the capabilities of the receiver device, and, optionally, to match the user's preferences. The processing for transformation is dependent on the form of the initial content and the final desired form. While in many instances, the process is fairly complex and requires intensive calculations, in some instances, the process may be relatively simple. For example, a user is driving in a car and wants to hear news in general, or wants to hear an audio program on a specific topic, but the received content is a multimedia-type file with both audio and video components. In this case, the transform process can parse the program file by stripping away the undesired component (for example, the video component) and saving and presenting the desirable component (in this case, the audio component) of the program file. Alternatively, the content is transformed from one form to another. For example, an HDTV presentation is transformed into a standard NTSC TV presentation. More drastic transformations can be performed as well. For example, an audio signal can be converted into text, using for example a known speech recognition algorithm. Alternatively, text is converted into speech. Other types of transformations may also be performed.

Returning to FIG. 6, in step 366 a check is performed as to whether the content requires an overall transformation. For example, if the received content is an analog TV signal with digital tags embedded into the VBI, then it is first necessary to at least transform the VBI time slice of the analog TV signal into a digital signal. It may also be necessary to digitize the remainder of the analog TV signal to decide which components of it, if any, to retain for further processing. If an initial overall transformation is needed, necessary parameters are obtained in step 366A, and the transformation is accomplished in step 366B.

In step 368 a check is performed as to whether all or only parts of the content need to be retained for further processing. More specifically, in step 368 a process is initiated that isolates one or several components of the received content. For example, the content may be a multimedia presentation, but the user wants to see only the visual part, (i.e., without any sound). However, most audio-video content is transmitted in a form in which the audio and visual components are multiplexed (for example, in time and/or frequency) together, for example, using MPEG transport. In order to obtain only the visual component, in step 370 the content is demultiplexed so that its components are clearly identifiable.

If the content is in the wrong form, it is transformed using a process starting with step 372. In step 372, a check is made as to whether the overall content, or the relevant components, thereof should be further transformed, for example, to suit device limitations. If no further transformations are required, the content, or the relevant components thereof, is decoded in step 374, if necessary. Otherwise, in step 376 the transform parameters are obtained. These transform parameters could be stored in a memory, or can be transmitted along with the media, or may be available from other sources. In step 378 the transformation is performed using the parameters from step 376. In step 374 decoding is performed, if necessary. The transformed content is then processed in the same manner as the standard content starting at step 354 as shown.

As discussed above, the systems described can be used for rendering content to users in different manners. One mode of operation is illustrated in FIG. 7. In step 400 content is received. This content may have been received in response to a standing request for content, in response an immediate search, it may have been pushed by the content provided, etc. In step 402 the user gets an announcement or other indication that the content is ready to be presented to the user. In step 404 a decision is made as to whether the content is to be rendered immediately, or at a later date. This may depend in a number of factors, including the source of the content request, whether the user is apparently present, whether the selected device on which the content is to be rendered is operational, etc. If in step 404 it is determined that rendering can proceed immediately, then in step 406 the content is processed (transformation is performed at the same time). For example the content can be decrypted. Other processing may include verifying the tags of the content, eliminating content with unacceptable material, and so on. In step 408 the content is prepared for rendering. For example, digital data may be converted to analog signals. After suitable preparation, the content is then rendered in step 410.

If in step 404 it is determined that rendering is not required immediately, then the content is stored in step 412.

Once content has been stored, the user can request it at will, which request is received in step 414. in step 416, the list of available content is presented to the user in any suitable form. As discussed above, the list organizes the content using one or more relations therebetween. In step 418 a selection from the table is obtained. In step 420 the requested content, or the content best matching the request is retrieved from memory and processed in step 406. Again, this processing step may include a transformation, if necessary. The content is then prepared in step 408 and rendered in step 410.

Figure 8:
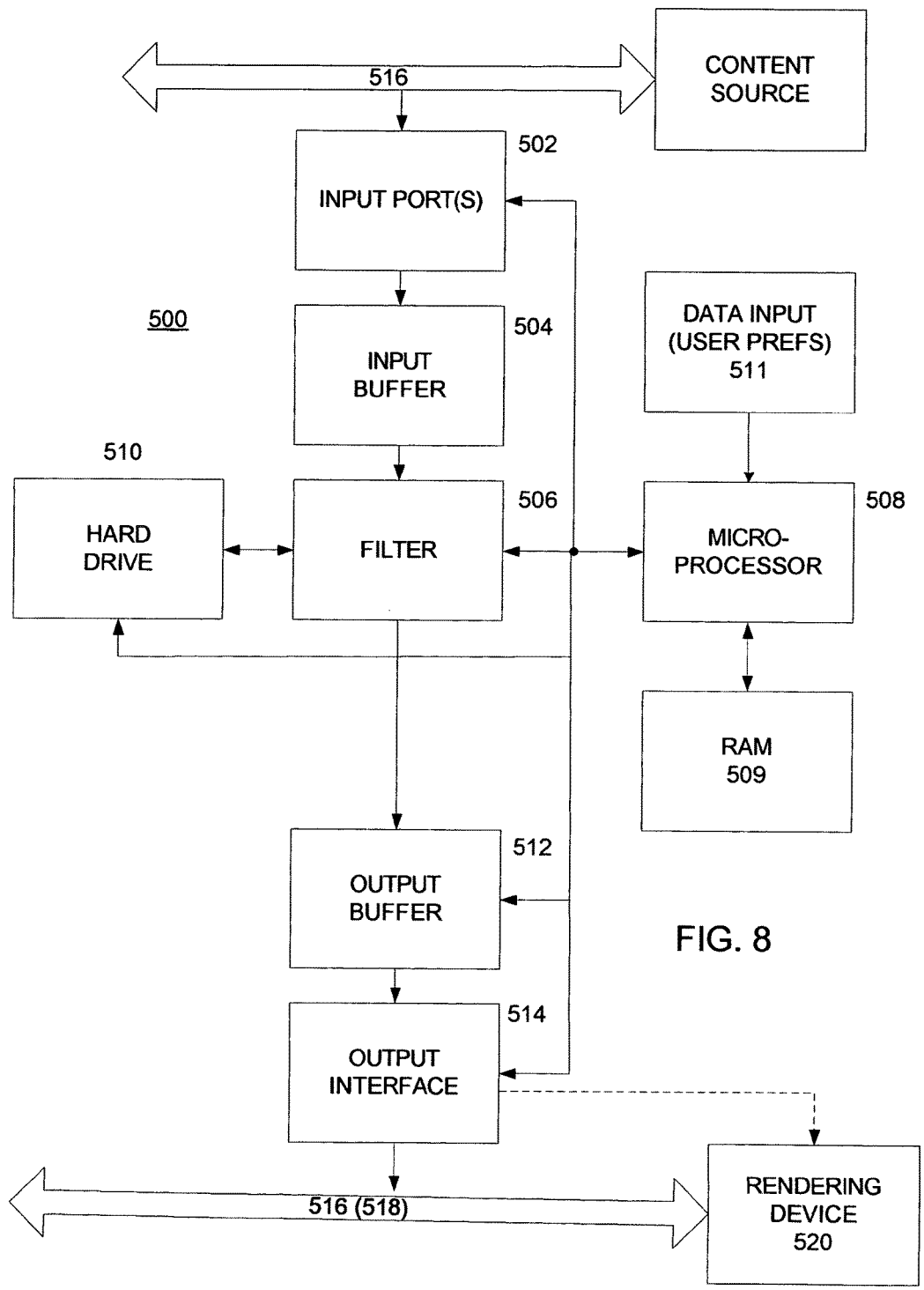
FIG. 8 shows an embodiment of the invention wherein content is filtered by a personal video recorder.

FIG. 8 shows how the invention is implemented on a personal video recorder 500. The recorder 500 includes an input port 502. Of course, the recorder 500 can have one, or several input ports. Content is received via the port and is stored in an input buffer 504. The content is then analyzed by a filter 506 to determine if it meets certain predetermined criteria. These criteria may include characteristics compatible with a rendering device 520 (discussed more fully below) and/or the requirements of a user. Rules and criteria for this determination are obtained from a microprocessor 508. This microprocessor 508 controls all the normal functions of the PVR (including, for example, record, store, play, etc). In the present invention, the microprocessor 508 also controls the operation of the filter 506 and the transfer of content between the components of the recorder 500. the programming of the microprocessor 508 and control data, including the rules for filtering content are stored in a RAM 509. Various programming data, including, for example, user preferences, are received by the microprocessor 508 through input 511.

In one embodiment, if the content meets the predetermined criteria then the content is transferred to a mass storage means, such as a hard drive 510.

When requested by a user, the content is transferred to an output buffer 512. From this buffer 512, the content is then fed to an output interface 514. Thus, depending on user preferences and other criteria, content is rendered by device 520 either in real time, or at a later time. The output interface sends the content to the rendering device 520. Typically, the rendering device is a multimedia presentation apparatus such as an HDTV system.

If the content does not meet the predetermined criteria, it is simply discarded, for example by deleting the contents of the input buffer 504.

The recorder 500 may be integrated into, or at least connected to a home network that is used to distribute content and other materials to various devices within a home. In this embodiment, the content is received by the input port 502 through the home network 516. The content is then sent to the rendering device 520 (and/or other rendering devices, such as portable music players, etc.) either through the home network 516 or, possibly, through another network 518.

In another embodiment of the invention, the content is partitioned into several segments, each segment having its own tags or other coding means. The filter 506 then determines whether particular segments of the content meet the predetermined criteria. For example, a user may designate content related to animal shows about wolves. If content is received that includes one segment about foxes and the other segment about wolves, then the filter 506 discards the segment about foxes and only saves on the hard drive 510 the segment about wolves. Alternatively, the segment about foxes is saved (either together with the segment on wolves, or separately) for a later presentation.

Similarly, if for some reason the content includes several segments of various types of media, the segments with media compatible with the rendering device 520 are saved, while the others are discarded.

The filtering can be done in real time, and the content can then be stored on the hard drive, streamed to a rendering device, or both. In many cases, the rendering device has sufficient memory to receive the streaming content, and buffer it temporarily. For example, if the rendering device is a TV receiver, it may be able to buffer only a couple of frames. The remaining content is then stored either on the hard drive 510 or the output buffer 512. On the other hand, a portable music player usually has a much larger capacity and can store a large number of songs. Buffering may also be necessary if the rendering device is temporarily unavailable. For example, the rendering device may be occupied with some intensive signal processing, it may be off line, or it may be out of range of the network. Alternatively, buffering may be required because the rendering device may not have sufficient capacity or resources to receive the content in a single data transfer operation.

As mentioned above, in some instances the type of content may not be known and therefore it may be difficult to determine whether the user site has even the capability of rendering the content without some further analysis and processing. According to this invention, in such instances, the content is first downloaded and stored in either the input buffer or the hard drive. The content can then be analyzed the microprocessor 508 as discussed above to determine whether the content should be accepted or not and whether the content can be played as is or whether it needs to be converted. Once this analysis is completed, the content is then discarded, sent to the rendering device, stored for future rendering, or converted into an acceptable type.

In the recorder embodiments discussed so far, the content itself is not transformed. In another embodiment, the content is transformed by the filter 506 so that it is converted to a type that meets the predetermined criteria. For example, some of the characteristics of the content that may be changed include aspect ratio, color bit depth, sound, etc. This embodiment is particularly advantageous in a recorder because the recorder is idle very often (for example, at night) and the microprocessor 508 is free to do the necessary signal processing during this time.

Another type of conversion pertains to the type of content rather then its physical characteristics. For example, a segment of the content may contain material objectionable by the user. The objectionable material is typically identified by an appropriate tag. The PVR transforms this content to eliminate the objectionable material, either by deleting the respective segment(s) or substituting other segment(s). These other segments may be provided by the content distributor, or by a third party.

Alternatively, one or more generic segments may be stored by the PVR and used to replace objectionable segments from the content as needed. In another embodiment, instead of replacing objectionable content segments, the microprocessor 508 analyzes the content, determines what graphic (or audio) portions of the content segments are objectionable, and then mask or replace only the objectionable portions of the content segment with sanitized, generic, or blank material. Again, these sanitized portions may be received from external sources or may be generated internally. Portions may be sanitized by blurring, or scrambling the same.

Of course, while the substitution or deletion of the objectionable portions is taking place, transmission of that content to the rendering device is delayed, as disclosed in U.S. Pat. No. 6,351,596.

One perennial problem with any content distributed through an unsecured channel is that it may contain viruses or other programs that may corrupt the content and even damage the user system. Therefore, in another embodiment, when content is first received, it may be stored in the input buffer or other similar memory means provided for this purpose. In this embodiment, the content is quarantined by the input buffer until the microprocessor 508 scans it to insure that it is safe (i.e., it does not contain any viruses, etc.) Once the content is found to be safe, it is then stored on the hard drive 510 and/or distributed to the rendering device 520 as discussed. Instead of, or in addition to the scanning, the content may be declared to be safe when a message is received from a third party indicating vouching that the content is safe.

In another embodiment, the producer or distributor of the content may decide to release the content to the public only at a certain specific date and time. The content in this case is stored in the input buffer, or other similar means until such time that it can be released, as determined by the microprocessor 508, for example, in response to a separate release signal received from a remote source.

One of the functions of the system may be to prioritize content. This function may also be implemented with a PVR. More particularly, in one embodiment, the PVR acts to prioritize use of home network bandwidth. In this embodiment, attached devices and/or their users are explicitly and/or implicitly assigned priorities at or by the PVR. The PVR monitors the loading on the home network, and if the aggregate bandwidth request of the attached devices exceeds the available PVR output bandwidth capacity, the PVR can take various actions to insure that the aggregate output bandwidth remains at or below its output capacity. For example, the PVR can simply successively terminate output to the lowest priority device/user, until its aggregate output is within capacity. In another embodiment, the PVR can transcode or otherwise convert content to reduce its aggregate output rate. In one variation of this embodiment, all devices/users have their data rates reduced, but lower priority devices/users suffer a greater data rate reduction, until the aggregate data rate is less than or equal to the aggregate PVR output capacity.

In one embodiment, the PVR provides language selection and/or translation service. For example, the PVR, having downloaded multiple language versions of an audio track, and based upon the preferences of the current user and that user's profile, can select a pre-stored Spanish language audio track for presentation to that user. In another embodiment, the PVR automatically translates the audio track from one language to another. For example although the audio track was originally recorded and downloaded to the PVR in English, the PVR is able to translate the audio track into Spanish. In one variation, the PVR automatically retrieves a Spanish language version of the audio track from the Internet. In another variation, the PVR performs language translation off-line. In another variation, the PVR performs language translation in real- or near-real-time.

In another embodiment, the PVR performs the function of a web page server for the home. In this embodiment, the PVR keeps track of the web-surfing history of the attached devices and/or their various users and updates its cached version of web pages recently surfed, by periodically checking the web to see if those pages have changed. The PVR can also acquire, cache, and update relevant web pages based on preferences of all of its attached (e.g., by home network) users. This process can be implemented, in one embodiment, without explicit user specification (e.g., merely by analysis of user actions by the PVR). As in the embodiments previously described, the PVR can filter web pages as a proxy for devices attached to the network 516, 518. For example, the PVR can effectuate parental control of which web pages can be viewed by whom. This may be preferred to, e.g., having inappropriate content filtered at each child's PC, since children may perhaps more easily hack their own PCs, to bypass any filtering software installed by parents.

While the invention has been described with reference to several particular embodiments, it is to be understood that these embodiments are merely illustrative of the principles of the invention. Accordingly, the embodiments described in particular should be considered as exemplary, not limiting, with respect to the following claims.

The invention claimed is:

1. A user device providing content to one or more users as one of an audio, audio/visual or text program, via a rendering system, said rendering system including a plurality of rendering devices, each rendering device being associated with a respective set of rendering device characteristics defining the presentation format in which content is presented to a user by each said rendering device, said user device comprising:
    a receiver receiving a program having a program format;
    a mediator connected to said receiver and said rendering system and being responsive to a user command to select at least one of said rendering devices of said rendering system, wherein said mediator is adapted to reject said program if said program is incompatible with the respective presentation format of said one of said rendering devices; and
    an output receiving said program from said mediator, and providing said program to said one rendering device.

2. The user device of claim 1 wherein said mediator is adapted to receive user preferences and to deliver said program to one of said rendering devices in accordance with said user preferences.

3. The user device of claim 1 further comprising a memory holding said presentation formats, said device characteristics and a set of rules used by said mediator to determine how to handle said program based on said presentation format of the connected device, said program format and said user preferences.

4. The user device of claim 1 further comprising said rendering devices.

5. The user device of claim 1 further comprising a selector operated by the user to select said one rendering device.

6. The user device of claim 1 further comprising a plurality of content sources providing programs to said processor.

7. A user device for presenting a program to a rendering device having a plurality of operating modes, each mode having corresponding rendering characteristics defining the presentation format in which content can be presented to users by the rendering device in the respective rendering device mode, said user device comprising;
    a receiver receiving a program having a program format for presentation to a user;
    a processor connected to said rendering device, said processor further receiving said program from said receiver and including a mediator, said mediator receiving a user input indicating that the rendering device is to operate in one of said modes, said mediator being adapted to determine if said program is compatible with said rendering device operating in said one of said operating modes based on the program format and the presentation format of said one of said operating modes, wherein said mediator is adapted to reject said program if said program is incompatible with the respective presentation format of said rendering device: operating in said one of said operating modes, and
    an output receiving said program from said mediator when said program is accepted by said mediator and providing said program to said rendering device.

8. The user device of claim 7 further comprising said rendering device.

9. The user device of claim 8 further comprising a common housing, said input, said processor and said rendering device being disposed in said common housing.

10. The user device of claim 9 wherein said housing is a hand-held device.

11. The user device of claim 8 wherein said housing is a home entertainment system.

12. The user device of claim 7 further comprising a selector operated by the user to select said one operational mode.

13. The user device of claim 7 wherein said rendering device is adapted for mounting and operating in a motor vehicle.

14. The user device of claim 7 further comprising a plurality of content sources providing content to said processor.

15. A user device providing content of an audio, audio/visual or text program, via a rendering system, said rendering system including a plurality of rendering devices, each rendering device being associated with a respective set of rendering device characteristics defining the presentation format in which content is presented to a user by each said rendering device, said presentation format including at least one of audio parameters and visual parameters, said audio parameters defining whether a program is to be presented as a mono, stereo or multichannel presentation, and said visual parameters defining at least a size of the visual images to be presented to the user as part of said program, said user device comprising:

a receiver receiving a program having a program format defining audio and visual parameters for a presentation of said format;

a mediator connected to said receiver and said rendering system and being responsive to a user command to select one of said rendering devices of said rendering system, wherein said mediator is adapted to reject said program if said program is incompatible with the respective presentation format of said one of said rendering devices based on said audio or visual parameters; and an output receiving said program from said mediator, and providing said program to said one rendering device in said presentation format.

* * * * *